United States Patent
Park

(10) Patent No.: US 11,755,241 B2
(45) Date of Patent: Sep. 12, 2023

(54) STORAGE SYSTEM AND METHOD FOR OPERATING STORAGE SYSTEM BASED ON BUFFER UTILIZATION

(71) Applicant: Samsung Electronics Co., Ltd., Suwon-si (KR)

(72) Inventor: Junbum Park, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 17/548,889

(22) Filed: Dec. 13, 2021

(65) Prior Publication Data
US 2022/0188021 A1   Jun. 16, 2022

(30) Foreign Application Priority Data
Dec. 14, 2020 (KR) .................. 10-2020-0174729

(51) Int. Cl.
  *G06F 3/06* (2006.01)
(52) U.S. Cl.
  CPC .......... *G06F 3/0656* (2013.01); *G06F 3/0604* (2013.01); *G06F 3/0631* (2013.01); *G06F 3/0659* (2013.01); *G06F 3/0667* (2013.01); *G06F 3/0688* (2013.01)
(58) Field of Classification Search
  CPC .... G06F 3/0656; G06F 3/0604; G06F 3/0631; G06F 3/0659; G06F 3/0688; G06F 13/26; G06F 13/1626; G06F 13/1605; G06F 13/14
  See application file for complete search history.

(56) References Cited

U.S. PATENT DOCUMENTS

| | | | |
|---|---|---|---|
| 7,003,564 B2 | 2/2006 | Greuel et al. | |
| 7,213,087 B1 * | 5/2007 | Bertone | H04L 49/90 710/56 |
| 8,788,658 B2 | 7/2014 | Ashok et al. | |
| 8,964,547 B1 | 2/2015 | Rygh et al. | |
| 9,537,743 B2 | 1/2017 | Deshpande et al. | |
| 9,804,790 B2 | 10/2017 | Park et al. | |

(Continued)

FOREIGN PATENT DOCUMENTS

KR   2016-0092760 A   8/2016

OTHER PUBLICATIONS

NVM Express, Based Specification, Revision 1.4, Jun. 19, 2019 (Year: 2019).*

(Continued)

*Primary Examiner* — Khoa D Doan
(74) *Attorney, Agent, or Firm* — Harness, Dickey & Pierce, P.L.C.

(57) ABSTRACT

A storage device includes a buffer memory configured to temporarily store data; a plurality of nonvolatile memory devices; a storage controller circuit configured to generate buffer memory status information by monitoring a status of the buffer memory and operating in a congestion control mode of setting a buffer memory data transmission authority of a nonvolatile memory based on the generated buffer memory status information; and a first interface circuit configured to communicate with the storage controller circuit and the plurality of nonvolatile memory devices, wherein the first interface circuit is connected to a network based on an Ethernet interface.

18 Claims, 10 Drawing Sheets

(56) References Cited

U.S. PATENT DOCUMENTS

| | | | |
|---|---|---|---|
| 10,001,827 B2 | 6/2018 | Woo et al. | |
| 2003/0095503 A1 | 5/2003 | Ha | |
| 2008/0101236 A1 | 5/2008 | Miyamoto | |
| 2017/0300263 A1* | 10/2017 | Helmick | G06F 3/0679 |
| 2018/0188952 A1* | 7/2018 | Carlton | G06F 3/0679 |
| 2018/0239540 A1 | 8/2018 | Kachare et al. | |
| 2019/0220201 A1* | 7/2019 | Jia | G06F 12/023 |
| 2021/0064286 A1* | 3/2021 | Jung | G06F 3/0656 |
| 2021/0344600 A1* | 11/2021 | Urman | H04L 47/12 |

OTHER PUBLICATIONS

A. Kougkas, H. Devarajan, X. -H. Sun and J. Lofstead, "Harmonia: An Interference-Aware Dynamic I/O Scheduler for Shared Non-volatile Burst Buffers," 2018 IEEE International Conference on Cluster Computing (CLUSTER), Belfast, UK, 2018, pp. 290-301, doi: 10.1109/CLUSTER.2018.00046. (Year: 2018).*

* cited by examiner

FIG. 7

| CONGESTION CONTROL SIGNAL (CCS) |
|---|
| MEMORY ID |
| CONTROL MODE |
| DATA TOKEN |
| PRIORITY/WEIGHT |

FIG. 8

| MEMORY ID | PRIORITY | WEIGHT |
|---|---|---|
| NVM1 | 1 | 4 |
| NVM2 | 2 | 2 |
| NVM3 | 3 | 2 |
| NVM4 | 4 | 1 | ial

STORAGE SYSTEM AND METHOD FOR OPERATING STORAGE SYSTEM BASED ON BUFFER UTILIZATION

CROSS-REFERENCE TO RELATED APPLICATION

This application is based on and claims priority under 35 U.S.C. § 119 to Korean Patent Application No. 10-2020-0174729, filed on Dec. 14, 2020, in the Korean Intellectual Property Office, the disclosure of which is incorporated by reference herein in its entirety.

BACKGROUND

1. Field

At least some example embodiment of the inventive concepts relate to a storage system, and more particularly, to a storage system including a congestion control function using a token

2. Related Art

A representative example of flash memory-based large-capacity storage devices is a solid state drive (SSD). Along with an explosive demand increase of SSDs, the usages thereof have been variously differentiated. For example, the usages of SSDs may be subdivided into SSDs for a server, SSDs for a client, SSDs for a data center, and the like. An interface of an SSD is supposed to provide an optimal speed and reliability according to each usage. To meet the requirements, nonvolatile memory express (NVMe), based on serial advanced technology attachment (SATA), serial attached small computer system interface (SCSI) (SAS), and peripheral component interconnection express (PCIe), has been briskly researched and applied.

Recently, SSD interfaces for providing the easiness of expansion in systems such as a large-capacity data center have been briskly developed. In particular, NVMe over Fabrics (NVMe-oF) as a standard for mounting an SSD on a network fabric such as an Ethernet switch has been briskly researched. NVMe-oF supports an NVMe storage protocol through extensive storage networking fabrics (e.g., Ethernet, Fibre Channel, InfiniBand, and the like).

SUMMARY

According to at least some example embodiments of the inventive concepts, a storage device includes a buffer memory configured to temporarily store data; a plurality of nonvolatile memory devices; a storage controller circuit configured to generate buffer memory status information by monitoring a status of the buffer memory and operating in a congestion control mode of setting a buffer memory data transmission authority of a nonvolatile memory based on the generated buffer memory status information; and a first interface circuit configured to communicate with the storage controller circuit and the plurality of nonvolatile memory devices, wherein the first interface circuit is connected to a network based on an Ethernet interface.

According to at least some example embodiments of the inventive concepts, a method of operating a storage device includes generating buffer memory status information by monitoring a status of a buffer memory; setting a data transmission mode of a plurality of nonvolatile memory devices based on the generated buffer memory status information; and controlling the plurality of nonvolatile memory devices based on the set data transmission mode, wherein the data transmission mode includes a congestion control mode of limiting a data transmission amount when a utilization rate of the buffer memory is greater than a preset reference value.

According to at least some example embodiments of the inventive concepts, a non-transitory computer-readable recording medium has recorded thereon computer-readable instructions that, when executed by one or more processors, cause the one or more processors to perform operations including generating buffer memory status information by monitoring a status of a buffer memory; setting a data transmission mode of a plurality of nonvolatile memory devices based on the generated buffer memory status information; and controlling the plurality of nonvolatile memory devices based on the set data transmission mode, wherein the data transmission mode includes a congestion control mode of limiting a data transmission amount when a utilization rate of the buffer memory is greater than a preset reference value.

BRIEF DESCRIPTION OF THE DRAWINGS

The above and other features and advantages of example embodiments of the inventive concepts will become more apparent by describing in detail example embodiments of the inventive concepts with reference to the attached drawings. The accompanying drawings are intended to depict example embodiments of the inventive concepts and should not be interpreted to limit the intended scope of the claims. The accompanying drawings are not to be considered as drawn to scale unless explicitly noted.

FIG. 7 is a table of a congestion control signal of a storage device, according to at least one example embodiment of the inventive concepts;

FIG. 8 is a priority table of a storage device, according to at least one example embodiment of the inventive concepts;

DETAILED DESCRIPTION OF THE EMBODIMENTS

Figure 1:
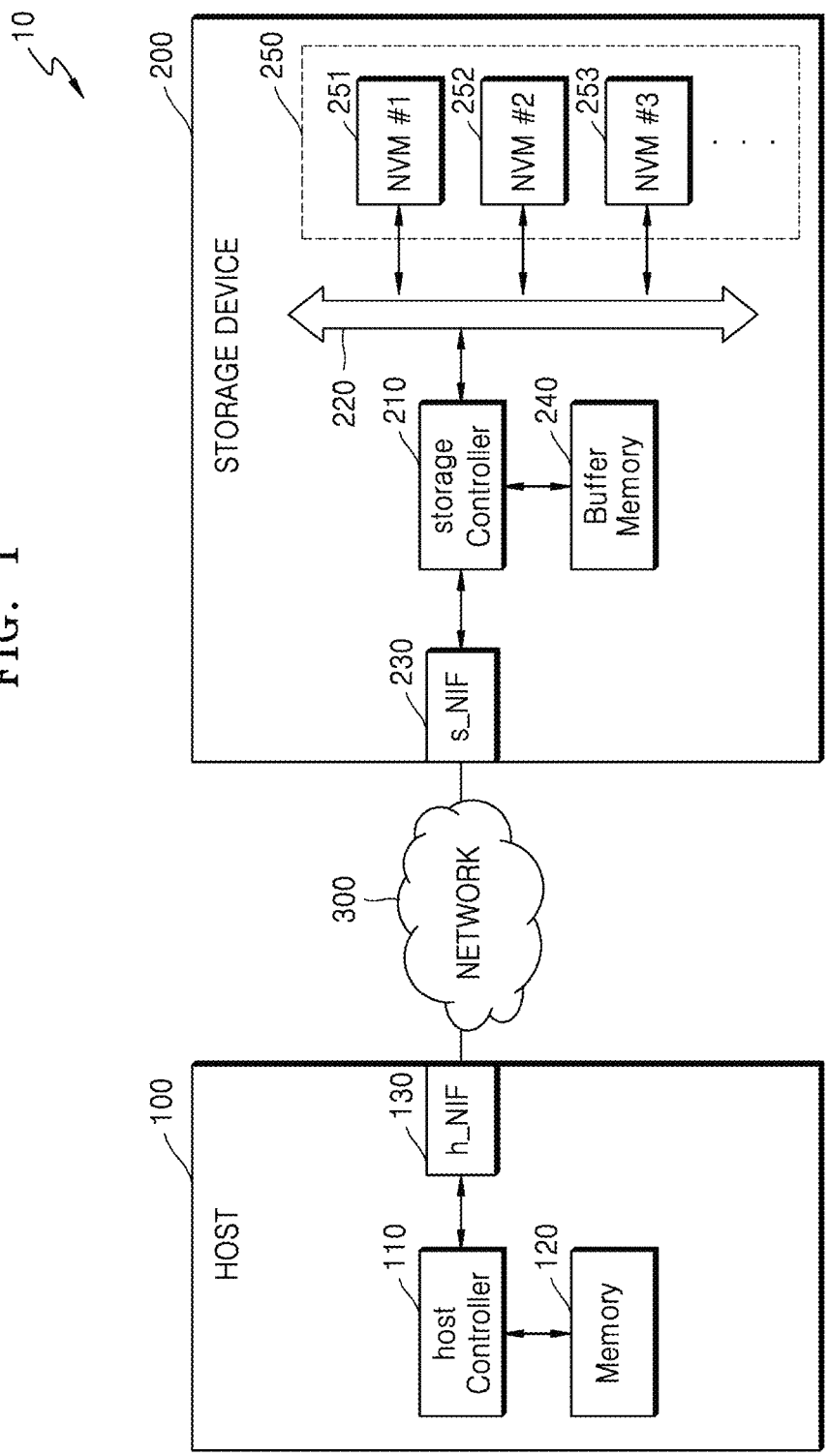
FIG. 1 is a block diagram of a storage system according to at least one example embodiment of the inventive concepts.

As is traditional in the field of the inventive concepts, embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the scope of the inventive concepts. Further, the blocks, units and/or modules of the embodiments may be physically combined into more complex blocks, units and/or modules without departing from the scope of the inventive concepts.

FIG. 1 is a block diagram of a storage system 10 according to at least one example embodiment of the inventive concepts.

Referring to FIG. 1, the storage system 10 may include a host 100, a network 300, and a storage device 200. The host 100 and the storage device 200 may exchange data through the network 300. The data may include a command and may be referred to as a packet, a frame, a message, or the like. Data transmitted from the host 100 may be referred to as command data, and data transmitted from the storage device 200 may be referred to as response data. The network 300 may include a network fabric such as Fibre Channel (FC), Ethernet, or InfiniBand.

The host 100 and the storage device 200 may include at least one network interface (NIF) configured to be connected to the network 300. The NIF may be referred to as a network interface card, a network interface controller, a local area network (LAN) card, an Ethernet adapter, an Ethernet card, or the like.

The host 100 may include a host network interface (h_NIF) 130, a host controller 110, and a memory 120. The storage device 200 may include a storage network interface 230, a buffer memory 240, a storage controller 210, a bus 220, and a nonvolatile memory (NVM) 250 including a plurality of NVM devices 251, 252, 253, . . . .

The h_NIF 130 may provide or receive data to or from the storage device 200 through the network 300.

The host controller 110 may generate a plurality of commands. A command may be a write command, a read command, or an erase command but is not limited thereto. The host controller 110 may sequentially provide the generated commands to the storage device 200. The storage device 200 may sequentially process the received commands and provide information about the processed commands to the host 100. The information about the processed commands may be identification information of the commands. The host controller 110 may manage an operation of storing data (e.g., write data) of a buffer region in the NVM 250 or storing data (e.g., read data) of the NVM 250 in the buffer region. The NVM 250 may also be referred to, in the present specification, as storage 250.

According to at least some example embodiments, the host 100 and/or host controller 110 may include processing circuitry such as hardware including logic circuits; a hardware/software combination executing software; or a combination thereof. For example, the processing circuitry more specifically may include, but is not limited to, one or more of a central processing unit (CPU), a processor core, an arithmetic logic unit (ALU), a digital signal processor, a microprocessor, a microcomputer, a field programmable gate array (FPGA), a programmable logic unit, a microprocessor, an application-specific integrated circuit (ASIC), etc. According to at least some example embodiments, the host controller 110 may be embodied by one or more circuits or circuitry. Accordingly, the host controller 110 may also be referred to, in the present specification, as the host controller circuit 110.

The memory 120 may function as a buffer memory configured to temporarily store data to be transmitted to the storage device 200 or data transmitted from the storage device 200.

According to an embodiment, the host controller 110 and the memory 120 may be implemented by separate semiconductor chips. Alternatively, in some embodiments, the host controller 110 and the memory 120 may be integrated in a same semiconductor chip. For example, the host controller 110 may be any one of a plurality of modules included in an application processor, and an application processor may be implemented by a system on chip (SoC). In addition, the memory 120 may be an embedded memory included in the application processor, or an NVM or a memory module outside the application processor.

Data may include identifier (ID) information of the h_NIF 130 included in the host 100, and the network 300 may transfer the data to the h_NIF 130 by referring to the ID information. In addition, by referring to ID information, one host may transmit and receive data to and from a plurality of storage devices, and a plurality of hosts may use one storage device.

The storage controller 210 may control the buffer memory 240 configured to temporarily store data of the NVM 250.

The buffer memory 240 may temporarily store (buffer) data to be written on the NVM 250 or data read from the NVM 250. In some embodiments, the buffer memory 240 may include dynamic random access memory (DRAM). In addition, the buffer memory 240 may store metadata, and the metadata may indicate user data, or data generated by the storage controller 210 to manage the NVM 250.

The storage controller 210 may be connected to the NVM 250 through the bus 220. The bus 220 may include one of an Ethernet interface, a peripheral component interconnect express (PCIe) interface, a small computer system interface (SCSI), a serial advanced technology attachment (SATA) interface, or an integrated drive electronics (IDE) interface but is not limited thereto.

Each of the plurality of NVM devices 251, 252, 253, . . . may perform an operation corresponding to a command received from the storage controller 210. Each of the plurality of NVM devices 251, 252, 253, . . . may perform the operation and then provide operation completion information to the storage controller 210. Each of the plurality of NVM devices 251, 252, 253, . . . may include at least one of flash memory, phase changed random access memory (PRAM), resistive random access memory (ReRAM), DRAM, and static random access memory (SRAM).

Figure 2:
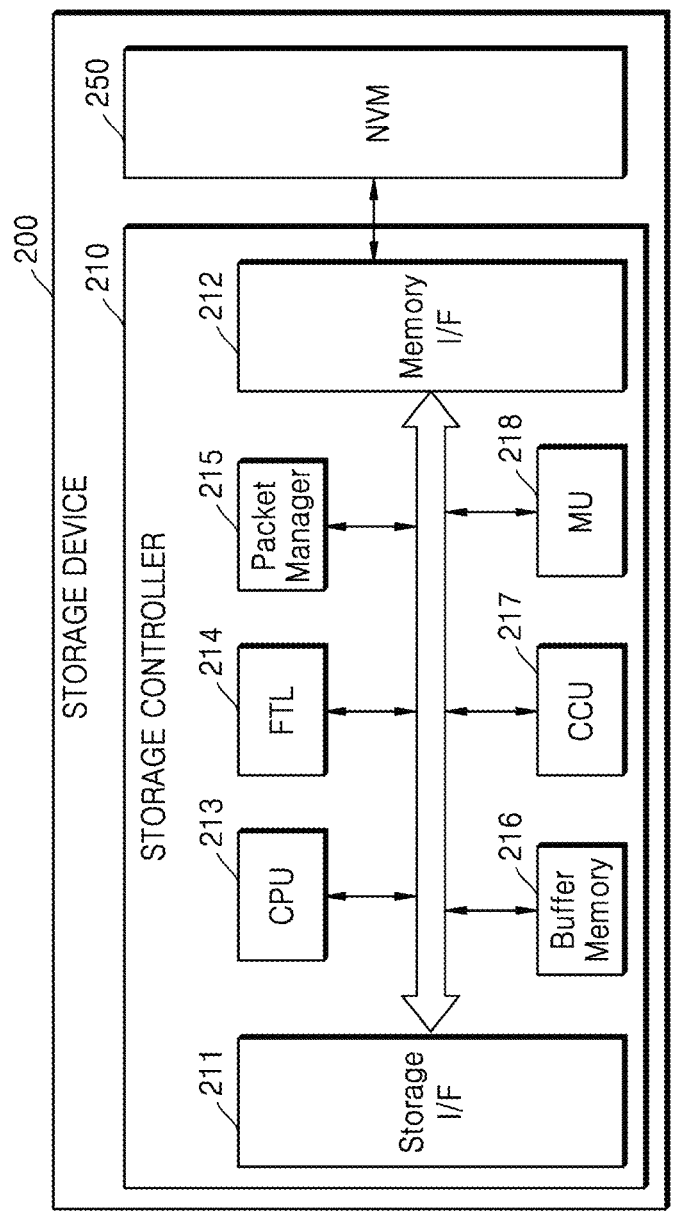
FIG. 2 is a block diagram of a storage device according to at least one example embodiment of the inventive concepts.

FIG. 2 is a block diagram of the storage device 200 according to at least one example embodiment of the inventive concepts.

The storage device 200 may include the storage controller 210 and the NVM 250. The storage device 200 may include storage media configured to store data in response to a request from the host 100. For example, the storage device 200 may include at least one of a solid state drive (SSD), an embedded memory, and a detachable external memory. When the storage device 200 is an SSD, the storage device 200 may conform to a nonvolatile memory express (NVMe) standard. When the storage device 200 is an embedded memory or an external memory, the storage device 200 may conform to a universal flash storage (UFS) or embedded multimedia card (eMMC) standard. The storage device 200 may generate and transmit a packet according to a corresponding employed standard protocol.

When the NVM 250 in the storage device 200 includes flash memory, the flash memory may include a two-dimensional (2D) NAND memory array or a three-dimensional (3D) (or vertical) NAND (VNAND) memory array. As another example, the storage device 200 may include other various types of NVMs. For example, magnetic RAM (MRAM), spin-transfer torque MRAM, conductive bridging RAM(CBRAM), ferroelectric RAM (FeRAM), PRAM, ReRAM, and other various types of memories may be applied to the storage device 200.

The storage controller 210 may include a storage interface 211, a memory interface 212, and a central processing unit (CPU) 213. In addition, the storage controller 210 may further include a flash translation layer (FTL) 214, a packet manager 215, a buffer memory 216, a congestion control unit (CCU) 217, and a monitoring unit (MU) 218. The storage controller 210 may further include a working memory (not shown) in which the FTL 214 is loaded, and the CPU 213 may control data write and read operations on the NVM 250 by executing the FTL 214.

According to at least some example embodiments, any or all of the flash translation layer (FTL) 214, packet manager 215, a congestion control unit (CCU) 217, and a monitoring unit (MU) 218 of the storage controller 210 may be embodied by processing circuitry such as hardware including logic circuits; a hardware/software combination executing software; or a combination thereof. For example, the processing circuitry more specifically may include, but is not limited to, one or more of a central processing unit (CPU), a processor core, an arithmetic logic unit (ALU), a digital signal processor, a microprocessor, a microcomputer, a field programmable gate array (FPGA), a programmable logic unit, a microprocessor, an application-specific integrated circuit (ASIC), etc. Accordingly, the FTL 214, packet manager 215, CCU 217, MU 218, and storage controller 210 may also be referred to, in the present specification, as the FTL circuit 214, packet manager circuit 215, CCU circuit 217, MU circuit 218, and storage controller circuit 210.

According to at least some example embodiments, the buffer memory 240, the NVM 250 and/or each of the NVM devices included in the NVM 250 (e.g., NVM devices 251-253) may include processing circuitry such as hardware including logic circuits; a hardware/software combination executing software; or a combination thereof. For example, the processing circuitry more specifically may include, but is not limited to, one or more of a central processing unit (CPU), a processor core, an arithmetic logic unit (ALU), a digital signal processor, a microprocessor, a microcomputer, a field programmable gate array (FPGA), a programmable logic unit, a microprocessor, an application-specific integrated circuit (ASIC), etc.

The storage interface 211 may transmit and receive a packet to and from the host 100. A packet to be transmitted from the host 100 to the storage interface 211 may include a command, data to be written on the NVM 250, or the like, and a packet to be transmitted from the storage interface 211 to the host 100 may include a response to the command, data read from the NVM 250, or the like. The memory interface 212 may transmit, to the NVM 250, data to be written on the NVM 250 or receive data read from the NVM 250. The memory interface 212 may be implemented to conform to a standard regulation such as Toggle or open NAND flash interface (ONFI).

The FTL 214 may perform several functions such as address mapping, wear-leveling, and garbage collection. An address mapping operation translates a logical address received from the host 100 into a physical address to be used to actually store data in the NVM 250. Wear-leveling is a technique of preventing excessive degradation of a particular block by making blocks in the NVM 250 be uniformly used and may be implemented by, for example, a firmware technique of balancing erase counts of physical blocks. Garbage collection is a technique of ensuring a usable capacity in the NVM 250 by copying effective data in a block to a new block and then erasing the existing block.

The packet manager 215 may generate a packet according to a protocol of an interface agreed with the host 100 or parse various kinds of information from a packet received from the host 100. In addition, the buffer memory 216 may temporarily store data to be written on the NVM 250 or data read from the NVM 250. The buffer memory 216 may be included in the storage controller 210 or be outside the storage controller 210.

The CCU 217 may control data transmission of the NVM 250 according to a status of the buffer memory 216. The CCU 217 may grant, to the NVM 250, an access right to the buffer memory 216, adjust a data transmission amount, a bandwidth, and the like, and schedule data transmission of the NVM 250. For the scheduling, a first in first out (FIFO) scheme, a round robin (RR) scheme, a deficit round robin (DRR) scheme, a weighted round robin (WRR) scheme, a proportional fair (PF) scheme, or the like may be used.

The MU 218 may monitor a status of the buffer memory 216. For example, the MU 218 may monitor a buffer memory utilization rate, a used buffer memory capacity, a spare buffer memory capacity, input and output data, a delay time taken to transmit data after a host data request, a data capacity transmitted from the NVM 250 to the buffer memory 216, a data capacity transmitted from the buffer memory 216 to the host 100, a data capacity transmitted from the host 100 to the buffer memory 216, a data capacity transmitted from the buffer memory 216 to the NVM 250, and the like. The MU 218 may transfer monitored data to the CCU 217. For example, when the buffer memory utilization rate is greater than a preset limit value, the MU 218 may transfer a control signal or a trigger signal to the CCU 217.

An error correction code (ECC) engine (not shown) may perform an error detection and correction function on read data read from the NVM 250. More particularly, the ECC engine may generate parity bits with respect to write data to be written on the NVM 250, and the generated parity bits may be stored in the NVM 250 together with the write data. When data is read from the NVM 250, the ECC engine may correct an error of the read data by using parity bits read from the NVM 250 together with the read data and output the error-corrected read data.

An advanced encryption standard (AES) engine (not shown) may perform at least one of an encryption operation and a decryption operation on data input to the storage controller 210 by using a symmetric-key algorithm.

The storage controller 210 may further include a bandwidth adjustment module (not shown). The bandwidth adjustment module includes hardware and software configured to perform bandwidth adjustment for adjusting an interface processing speed with a fabric network system. When an internal interface adjustment request is received from the fabric network system, the storage controller 210 may adjust an interface bandwidth of the storage device 200 based on the internal interface adjustment request by using the bandwidth adjustment module. As the interface bandwidth of the storage device 200 increases, the interface processing speed increases, and a power consumption amount increases. On the contrary, as the interface bandwidth of the storage device 200 decreases, the interface processing speed decreases, and the power consumption amount decreases.

Figure 3:
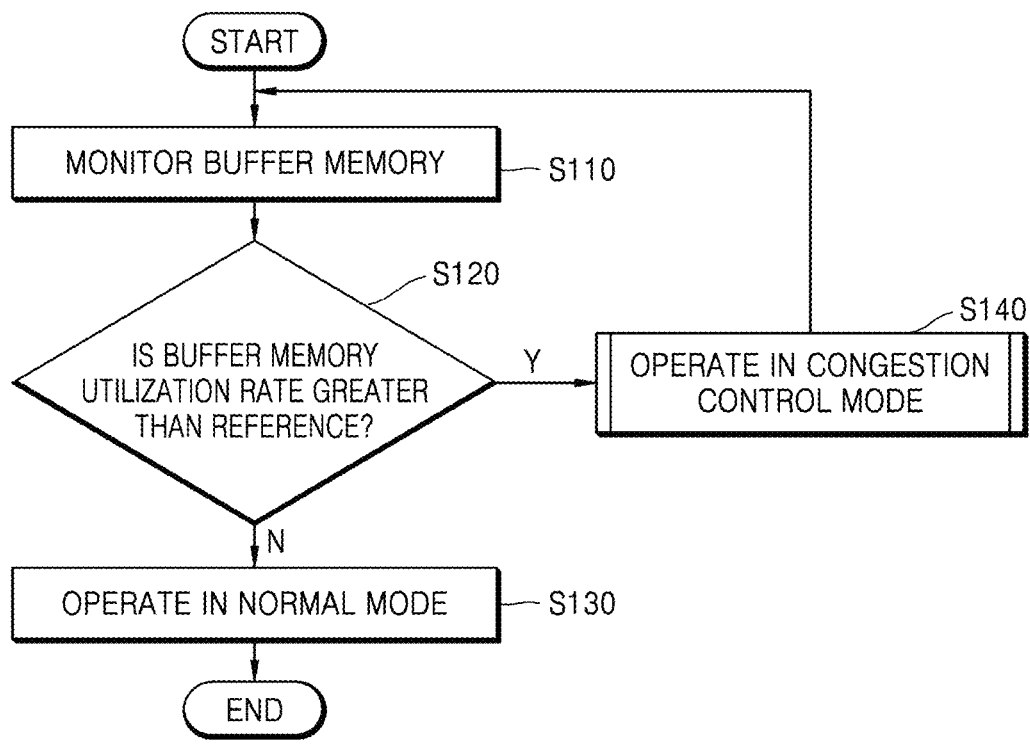
FIG. 3 is a flowchart of an operation of a storage device, according to at least one example embodiment of the inventive concepts.

FIG. 3 is a flowchart of an operation of a storage device, according to at least one example embodiment of the inventive concepts.

Referring to FIGS. 1 and 3, in operation S110, the storage device 200 may monitor a status of the buffer memory 240 through the storage controller 210. The monitored status of the buffer memory 240 may include a buffer memory utilization rate, a used buffer memory capacity, a spare buffer memory capacity, a data capacity transmitted from the NVM 250 to the buffer memory 240, a data capacity transmitted from the buffer memory 240 to the host 100, a data capacity transmitted from the host 100 to the buffer memory 240, a data capacity transmitted from the buffer memory 240 to the NVM 250, and the like.

In operation S120, the storage controller 210 may determine whether a utilization rate of the buffer memory 240 is greater than a preset reference value while monitoring a status of the buffer memory 240. In operation S130, the storage controller 210 may not operate in a congestion control mode but operate in a normal mode (as described in detail with reference to FIG. 4) when the utilization rate of the buffer memory 240 is the preset reference value or less.

In operation S140, the storage controller 210 may operate in the congestion control mode when the utilization rate of the buffer memory 240 is greater than the preset reference value. For example, in the congestion control mode, the storage controller 210 may generate data tokens corresponding to the spare buffer memory capacity and allocate the generated data tokens to each of the plurality of NVM devices 251, 252, 253, . . . in the NVM 250 according to a preset algorithm. Each of the plurality of NVM devices 251, 252, 253, . . . in the NVM 250 may transmit only data corresponding to the allocated data tokens, and thus, the storage controller 210 may manage the utilization rate of the buffer memory 240 by using data tokens.

The storage controller 210 may monitor a status of the buffer memory 240 while operating in the congestion control mode, and when the utilization rate of the buffer memory 240 is the preset reference value or less, the storage controller 210 may operate in the normal mode again.

Figure 4:
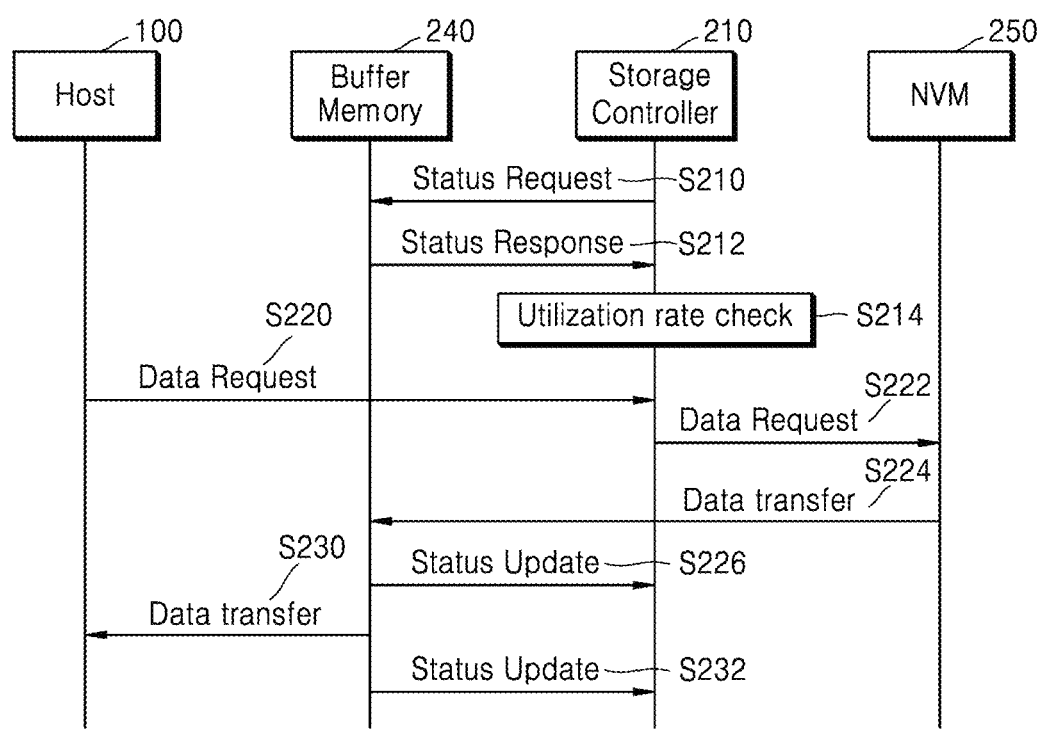
FIG. 4 is a signaling diagram of an operation of a storage device, according to at least one example embodiment of the inventive concepts.

FIG. 4 is a signaling diagram of an operation of a storage device, according to at least one example embodiment of the inventive concepts.

Referring to FIGS. 1 and 4, in the normal mode, a method of operating the storage controller 210 may include operations of: monitoring a status of the buffer memory 240; and controlling data transmission. The status monitoring operation may include operations S210, S212, and S214. In operation S210, the storage controller 210 may transmit a status request command to the buffer memory 240. In operation S212, the storage controller 210 may receive a requested status response from the buffer memory 240. The status response may include a buffer memory utilization rate, a used buffer memory capacity, a spare buffer memory capacity, a data capacity transmitted from the NVM 250 to the buffer memory 240, a data capacity transmitted from the buffer memory 240 to the host 100, a data capacity transmitted from the host 100 to the buffer memory 240, a data capacity transmitted from the buffer memory 240 to the NVM 250, and the like.

In operation S214, the storage controller 210 may determine an operation mode (the normal mode or the congestion control mode) according to the buffer memory utilization rate based on the received status response.

The status monitoring operation may be performed in the middle of a data transmission control operation like status update operations S226 and S232. Although FIG. 4 shows only the status update operations S226 and S232, the storage controller 210 may additionally perform operations: requesting the buffer memory 240 to update a status; and determining the operation mode (the normal mode or the congestion control mode) after the status update.

The host 100 may request data from the storage device 200. In operation S220, the storage controller 210 may receive a data request from the host 100. In operation S222, in the normal mode, the storage controller 210 may transfer the data request to the NVM 250 corresponding to the data request of the host 100. In operation S224, the NVM 250 may transmit, to the buffer memory 240, data corresponding to the data request. The buffer memory 240 may store the received data until the received data is transmitted to the host 100. In operation S230, the storage controller 210 may control the buffer memory 240 to transmit the stored data to the host 100. The storage device 200 may receive a data request from one or more hosts 100 and control data transmission through the storage controller 210.

The method of operating the storage controller 210 may further include operations of: identifying the host 100 or the storage 250 for data transmission between the host 100 or the storage 250; establishing a connection including 3way-handshaking, 4way-handshaking, or the like; processing an error occurring during the data transmission; and the like.

Figure 5:
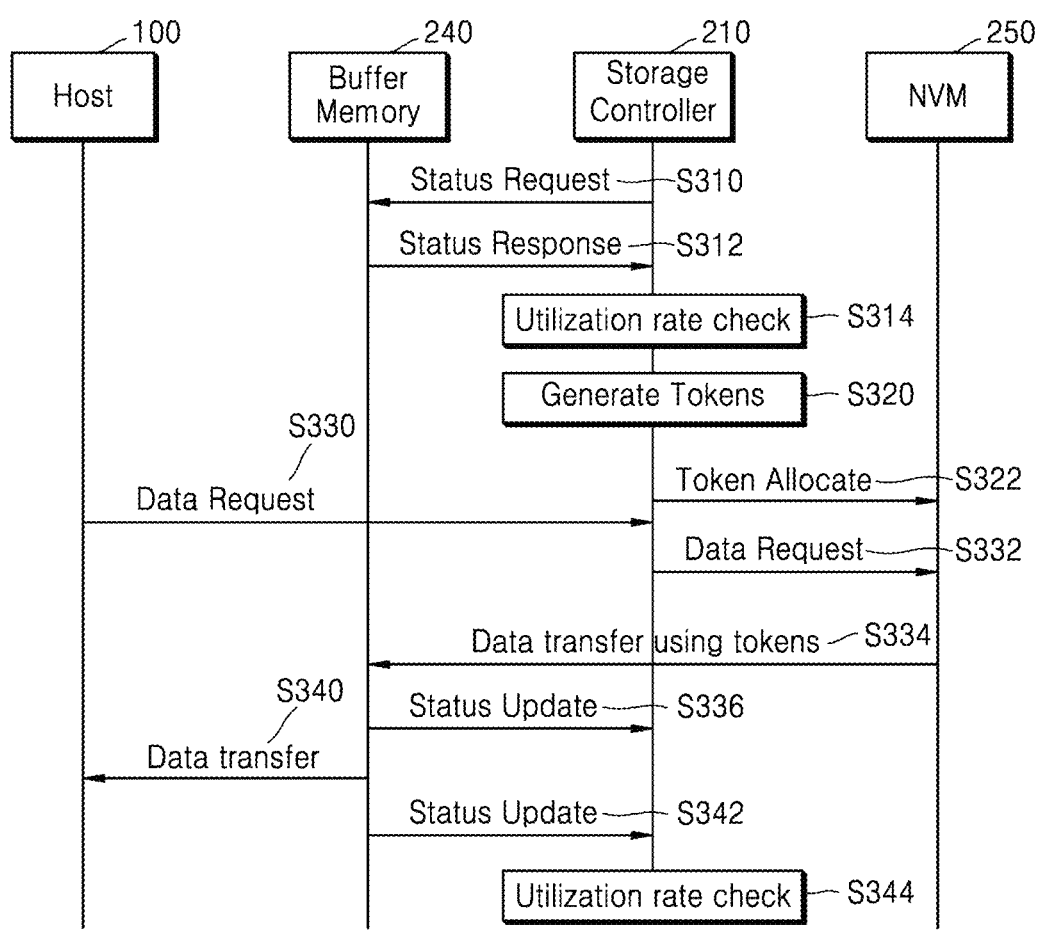
FIG. 5 is a signaling diagram of a storage device in a congestion control mode, according to at least one example embodiment of the inventive concepts.

FIG. 5 is a signaling diagram of a storage device in the congestion control mode, according to at least one example embodiment of the inventive concepts.

Referring to FIGS. 1 and 5, a method of operating the storage controller 210 in the congestion control mode may include operations: monitoring a status of the buffer memory 240; controlling data transmission; and managing data tokens. The state monitoring operation may include operations S310, S312, and S314. In operation S310, the storage controller 210 may transmit a status request command to the buffer memory 240. In operation S312, the storage controller 210 may receive a requested status response from the buffer memory 240. The status response may include a buffer memory utilization rate, a used buffer memory capacity, a spare buffer memory capacity, a data capacity transmitted from the NVM 250 to the buffer memory 240, a data capacity transmitted from the buffer memory 240 to the host 100, a data capacity transmitted from the host 100 to the buffer memory 240, a data capacity transmitted from the buffer memory 240 to the NVM 250, and the like.

In operation S314, the storage controller 210 may determine an operation mode (the normal mode or the congestion control mode) according to the buffer memory utilization rate based on the received status response. For example, the storage controller 210 may change the operation mode from the normal mode to the congestion control mode when the utilization rate of the buffer memory 240 is greater than the preset reference value.

The status monitoring operation may be performed in the middle of a data transmission control operation like status update operations S336 and S342. Although FIG. 5 shows only the status update operations S336 and S342, the storage controller 210 may additionally perform operations: requesting the buffer memory 240 to update a status; and checking the buffer memory utilization rate after the status update and determining the operation mode (the normal mode or the congestion control mode).

In the data token management operation, the storage controller 210 may generate data tokens in operation S320, allocate the data tokens to each of the plurality of NVM devices 251, 252, 253, . . . in the NVM 250 according to a preset algorithm in operation S322, control data transmission of the NVM 250 based on the allocated data tokens in operation S334, and monitor a data token holding amount or utilization amount of the NVM 250.

In the congestion control mode, the storage controller 210 may generate data tokens based on the buffer memory utilization rate or the spare buffer memory capacity in operation S320 and allocate the generated data tokens to the NVM 250 according to the preset algorithm in operation S322. In addition, when the spare buffer memory capacity increases by transmitting data from the buffer memory 240 to the host 100, the storage controller 210 may generate additional data tokens or change the operation mode to the normal mode again.

The host 100 may request data from the storage device 200. In operation S330, the storage controller 210 may receive a data request from the host 100.

In operation S332, the storage controller 210 may transfer the data request to the NVM 250 corresponding to the data request of the host 100. In operation S334, the NVM 250 may transmit data to the buffer memory 240 by using data tokens corresponding to a requested data amount. When data tokens for the NVM 250 are insufficient, the storage controller 210 may control the buffer memory 240 not to transmit data regardless of a data request. For example, when the NVM 250 holds one data token, the NVM 250 may be allowed to transmit c-size data, and when the NVM 250 holds n data tokens, the NVM 250 may be allowed to transmit n*c-size data. When certain-size data is transmitted from the NVM 250 to the buffer memory 240, data tokens corresponding to the certain-size data may be consumed.

The buffer memory 240 may store the received data until the received data is transmitted to the host 100. In operation S340, the storage controller 210 may control the buffer memory 240 to transmit the stored data to the host 100. When the data stored in the buffer memory 240 is transmitted to the host 100, the spare buffer memory capacity increases, and thus, the storage controller 210 may additionally generate data tokens.

In the aforementioned embodiment, it is described that the storage controller 210 operates in the normal mode or the congestion control mode based on a reference value, but the storage controller 210 is not limited thereto. According to various embodiments, the storage controller 210 may operate in a plurality of modes based on at least two thresholds. For example, the congestion control mode may be divided into a plurality of stages according to the buffer memory utilization rate. For example, when the buffer memory utilization rate is a first limit value or less, the storage controller 210 may operate in the normal mode, when the buffer memory utilization rate is greater than the first limit value and less than or equal to a second limit value, the storage controller 210 may operate in a first stage of controlling a data transmission amount by using data tokens, and when the buffer memory utilization rate is greater than the second limit value, the storage controller 210 may operate in a second stage of temporarily suspending data transmission. The congestion control mode may include more stages by further subdividing a scheduling method and a data transmission amount control method.

In addition, the storage controller 210 may estimate the buffer memory utilization rate by monitoring buffer memory input and output data, a data transmission rate, a delay speed, and the like and operate in the congestion control mode based on the estimated buffer memory utilization rate.

In the aforementioned embodiment, it is described that the storage controller 210 issues data tokens and controls a data transmission amount, a bandwidth, or the like in the congestion control mode, but the data transmission amount control method is not limited thereto, and the NVM 250 may control the data transmission amount, the bandwidth, or the like based on received data tokens.

Figure 6:
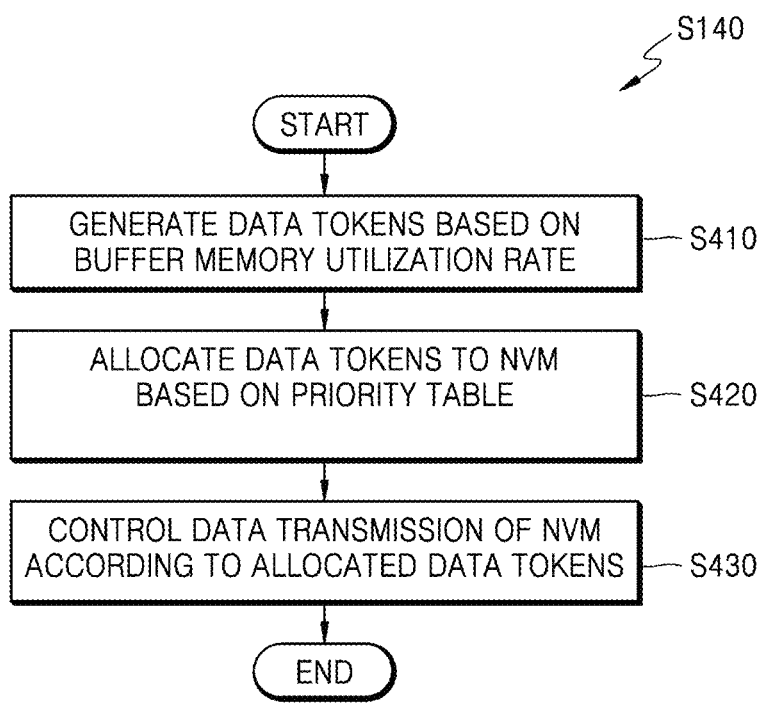
FIG. 6 is a flowchart of an operation of managing data tokens in a storage device, according to at least one example embodiment of the inventive concepts.

FIG. 6 is a flowchart of an operation of managing data tokens in a storage device, according to at least one example embodiment of the inventive concepts.

Referring to FIGS. 1 and 6, in operation S410, the storage controller 210 may generate data tokens in the congestion control mode. The storage controller 210 may generate data tokens based on the buffer memory utilization rate or the spare buffer memory capacity, and when the spare buffer memory capacity increases by transmitting data stored in the buffer memory 240 to the host 100, the storage controller 210 may generate additional data tokens.

In operation S420, the storage controller 210 may allocate the data tokens to each of the plurality of NVM devices 251, 252, 253, . . . in the NVM 250 according to a preset algorithm. The storage controller 210 may allocate the data tokens according to a token allocation rule including a data request order of the host 100, a requested data size, a waited time after a data request, a request priority set by the host 100, a priority classified for data or the NVM 250.

In operation S430, the storage controller 210 may control data transmission of the NVM 250 based on the allocated data tokens. In response to a data request of the host 100, the storage controller 210 may control data transmission by considering the data tokens allocated to the NVM 250. When data is transmitted to the buffer memory 240, the storage controller 210 may take away corresponding data tokens.

FIG. 7 is a table of a congestion control signal (CCS) of a storage device, according to at least one example embodiment of the inventive concepts.

Referring to FIGS. 1 and 7, the storage controller 210 may transmit a CCS through the bus 220 to control the NVM 250. The bus 220 may further include interfaces such as an inter-integrated circuit (I2C) interface, a universal asynchronous serial receiver-transmitter (UART) interface, and a serial peripheral interface (SPI) for device control besides an Ethernet interface, a PCIe interface, a SCSI, a SATA interface, or an IDE interface for data communication. For example, a first interface circuit for data communication may use the Ethernet interface, and a second interface circuit for device control signal transfer may use the I2C interface.

The CCS may include a memory ID for identifying the NVM 250, a control mode indicating the normal mode or the congestion control mode, a data token including data token information allocated to the NVM 250, and a priority and a weight for each data request.

FIG. 8 is a priority table of a storage device, according to at least one example embodiment of the inventive concepts.

For example, a priority and a weight of a first NVM NVM1 may be set to 1 and 4, respectively, a priority and a weight of a second NVM NVM2 may be set to 2 and 2, respectively, a priority and a weight of a third NVM NVM3 may be set to 3 and 2, respectively, and a priority and a weight of a fourth NVM NVM4 may be set to 4 and 1, respectively.

In an embodiment, the storage controller 210 may allocate four data tokens to the first NVM NVM1, two data tokens to the second NVM NVM2, two data tokens to the third NVM NVM3, and one data token to the fourth NVM NVM4 by considering the weights. When there are spare data tokens, the storage controller 210 may additionally allocate the spare data tokens according to the priorities. For example, when there are seven data tokens in second allocation, the storage controller 210 may first allocate four data tokens to the first NVM NVM1 and then allocate two data tokens to the second NVM NVM2. The storage controller 210 may allocate the remaining one data token to the third NVM NVM3 and end the second allocation.

In another embodiment, the storage controller 210 may allocate all data tokens needed to the first NVM NVM1 having the priority of 1 and allocate remaining data tokens to NVMs having lower priorities. There may be various token allocation methods, and the inventive concept is not limited to the allocation method described above.

In another embodiment, the storage controller 210 may first allocate necessary data tokens according to priorities and then allocate data tokens to NVMs having the same or substantially the same priority according to weights thereof.

Figure 9:
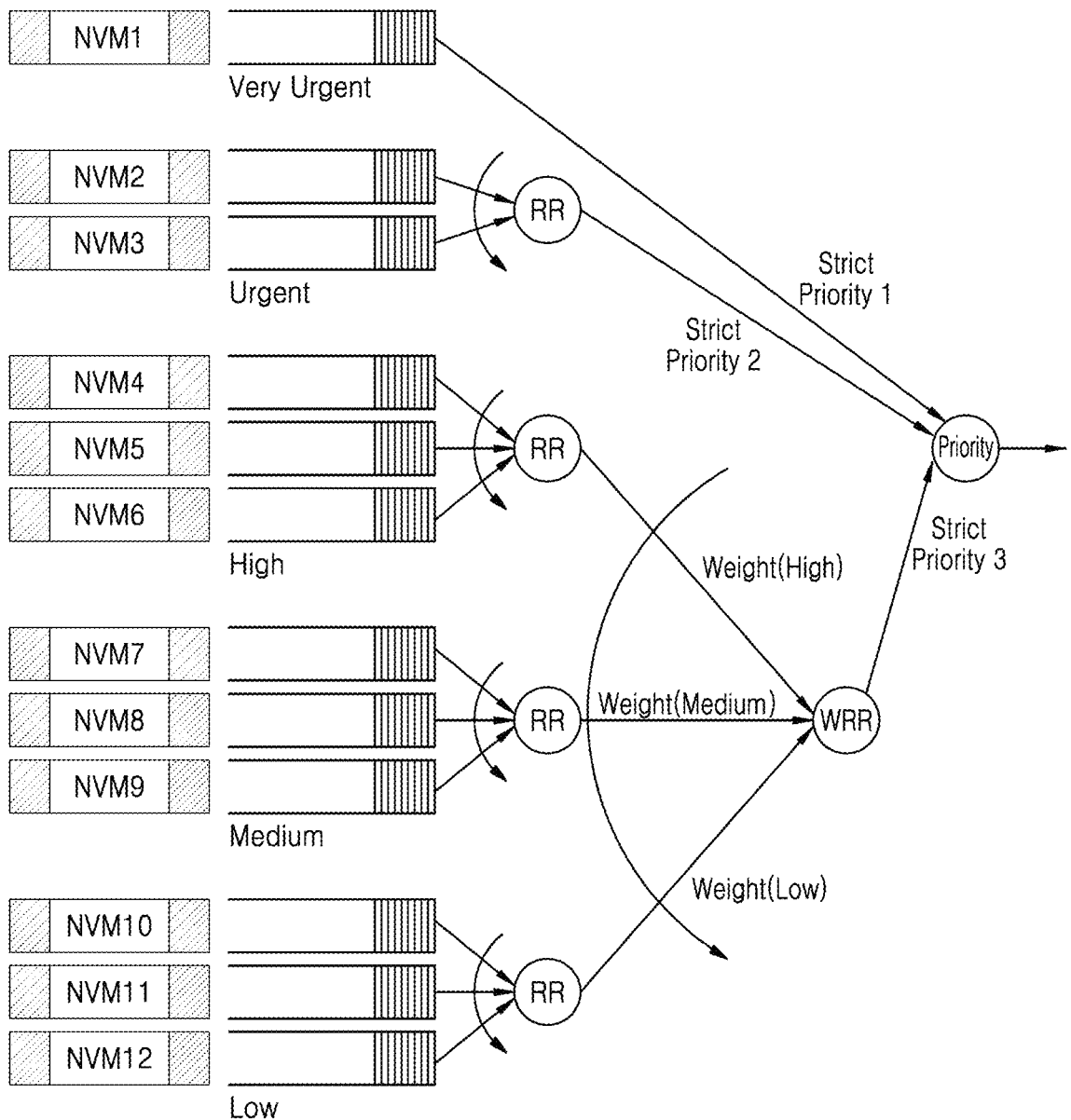
FIG. 9 is a diagram for describing a congestion control method of a storage device, according to at least one example embodiment of the inventive concepts.

FIG. 9 is a diagram for describing a congestion control method of a storage device, according to at least one example embodiment of the inventive concepts.

As a scheduling scheme for congestion control of a storage device, a FIFO scheme, an RR scheme, a DRR scheme, a WRR scheme, a PF scheme, and the like may be used.

A first come first served (FCFS) scheme is a quite simple scheduler and allocates resources to an NVM having first requested data transmission.

The RR scheme is a scheme in which resources are allocated to a plurality of NVMs in turn and, for example, uses an algorithm of executing packets of the same or substantially the same priority in turn at intervals of a time slice. WRR scheduling may grant a weight to each of NVMs to assign different data processing amounts to the NVMs.

In the DRR scheme, a series of NVMs is served in the RR scheme. Unlike the WRR scheme, the DRR scheme is a scheduling scheme designed to be served by considering a data length. A maximum data size is subtracted from a current size of data, and data larger than the maximum data size is suspended until a nest scheduler comes. According to at least some example embodiments, a value of the maximum data size may be determined based on the preferences of a designer and/or operator of the storage device 200 and/or the storage controller 210, for example, based on an empirical analysis of potential values.

Weighted DRR (WDRR) is a modified algorithm of DRR, in which additional weighted functions are added to DRR scheduling to provide not only ensured processing capability of each class but also an appropriate access for an excessive bandwidth. In WDRR, different weights may be respectively granted to NVMs so that quality of service (QoS) requirements requested by several service flows are properly guaranteed.

PF is a scheme of allocating resources according to a rank of a ratio of a currently obtainable rate to an average rate of each traffic flow. This scheme includes a first stage in which a scheduler discovers a traffic flow having a best ratio of a currently obtainable rate to an average rate and allocates a resource to the discovered traffic flow, and a second stage of updating averaged rate values of all traffic flows even when a traffic flow does not have a packet to be transmitted.

For example, referring to FIG. 9, the congestion control method may mix and use a plurality of scheduling methods. A priority of a first NVM NVM1 may be classified into very urgent, priorities of second and third NVMs NVM2 and NVM3 may be classified into urgent, priorities of fourth to sixth NVMs NVM4, NVM5, and NVM6 may be classified into high, priorities of seventh to ninth NVMs NVM7, NVM8, and NVM9 may be classified into medium, and priorities of tenth to twelfth NVMs NVM10, NVM11, and NVM12 may be classified into low.

Data of the first NVM NVM1 may be classified into a first priority and first processed. Data of the second and third NVMs NVM2 and NVM3 may be processed when the data of the first NVM NVM1 is completely transmitted. Because the priorities of the second and third NVMs NVM2 and NVM3 are the same or substantially the same, the second and third NVMs NVM2 and NVM3 may transmit data in the RR scheme.

Resources may be allocated in the WRR scheme to NVM groups classified based on priorities of high, medium, and low. A higher weight may be assigned to a group having a higher priority, and a lower weight may be assigned to a group having a lower priority. Resources may be allocated in the RR scheme to NVMs in each group (e.g., the fourth to sixth NVMs NVM4, NVM5, and NVM6 in a group having the priority of high)

In addition, the congestion control method may additionally limit a data transmission amount of an NVM by using data tokens. For example, even when resources are allocated according to the scheduling scheme described above, data transmission of each NVM may be limited according to the number of data tokens received from the storage controller 210. An NVM may transmit a data amount corresponding to the number of received data tokens, and when the data tokens are consumed, data transmission may be limited until additional data tokens are received.

Figure 10:
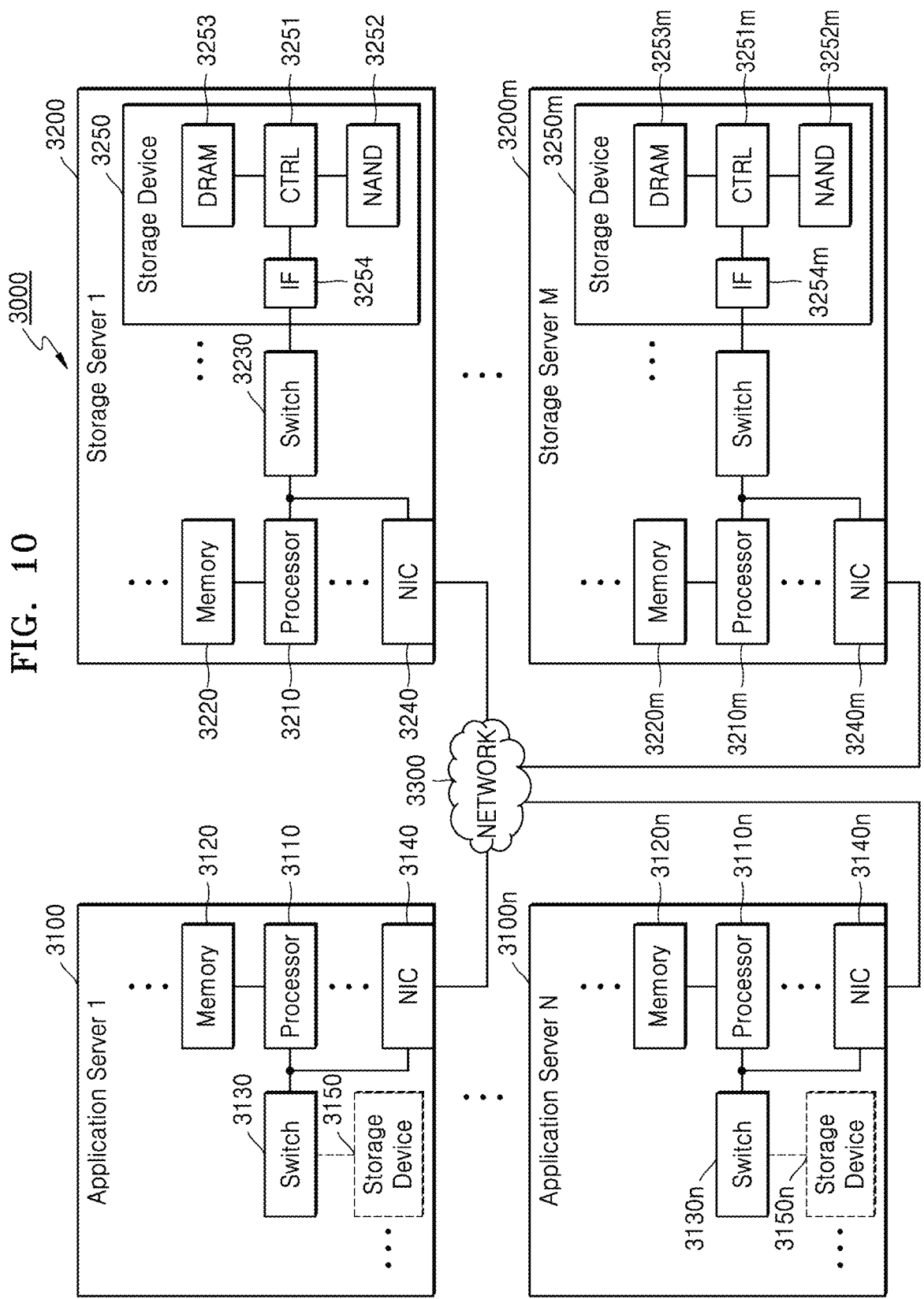
FIG. 10 is a block diagram of a data center to which a storage device according to at least one example embodiment of the inventive concepts is applied.

FIG. 10 is a block diagram of a data center 3000 to which a storage device according to at least one example embodiment of the inventive concepts is applied.

Referring to FIG. 10, the data center 3000 is a facility for collecting various kinds of data and providing a service and may be referred to as a data storage center. The data center 3000 may be a system for operating a search engine and a database or a computing system used in an enterprise, such as a bank, or a government organization. The data center 3000 may include application servers 3100 to 3100$n$ and storage servers 3200 to 3200$m$. The number of application servers 3100 to 3100$n$ and the number of storage servers 3200 to 3200$m$ may be variously selected according to embodiments, and the number of application servers 3100 to 3100$n$ may differ from the number of storage servers 3200 to 3200$m$.

The application server 3100 or the storage server 3200 may include at least one of a processor 3110 or 3210 and a memory 3120 or 3220. When describing the storage server 3200 as an example, the processor 3210 may control a general operation of the storage server 3200, and access the memory 3220 to execute an instruction and/or data loaded on the memory 3220. The memory 3220 may include double data rate synchronous DRAM (DDR SDRAM), a high bandwidth memory (HBM), a hybrid memory cube (HMC), a dual in-line memory module (DIMM), an Optane DIMM, or a nonvolatile DIMM (NVDIMM). According to embodiments, the numbers of processors 3210 and memories 3220 included in the storage server 3200 may be variously selected. In an embodiment, the processor 3210 and the memory 3220 may provide a processor-memory pair. In an embodiment, the number of processors 3210 may differ from the number of memories 3220. The processor 3210 may include a single-core processor or a multi-core processor. The description of the storage server 3200 may be similarly applied to the application server 3100. According to embodiments, the application server 3100 may not include a storage device 3150. The storage server 3200 may include at least one storage device 3250. The number of storage devices 3250 included in the storage server 3200 may be variously selected according to embodiments.

The application servers 3100 to 3100n and the storage servers 3200 to 3200m may communicate with each other through a network 3300. The network 3300 may be implemented by using FC, Ethernet, or the like. Herein, FC is a medium used in relatively high speed data transmission and may use an optical switch configured to provide high performance/high availability. According to an access method of the network 3300, the storage servers 3200 to 3200m may be provided as a file storage, a block storage, or an object storage.

In an embodiment, the network 3300 may be a storage-exclusive network such as a storage area network (SAN). For example, the SAN may be an FC-SAN using an FC network and implemented according to an FC protocol (FCP). As another example, the SAN may be an Internet protocol (IP)-SAN using a transmission control protocol (TCP)/IP network and implemented according to an SCSI over TCP/IP or an Internet SCSI (iSCSI) protocol. In another embodiment, the network 3300 may be a general network such as a TCP/IP network. For example, the network 3300 may be implemented according to an FC over Ethernet (FCoE) protocol, a network attached storage (NAS) protocol, an NVMe over Fabrics (NVMe-oF) protocol, or the like.

Hereinafter, the application server 3100 and the storage server 3200 will be mainly described. The description of the application server 3100 may be applied to another application server 3100n, and the description of the storage server 3200 may be applied to another storage server 3200m.

The application server 3100 may store data, requested by a user or a client to store, in one of the storage servers 3200 to 3200m through the network 3300. In addition, the application server 3100 may acquire data, requested by a user or a client to read, from one of the storage servers 3200 to 3200m through the network 3300. For example, the application server 3100 may be implemented by a web server, a database management system (DBMS), or the like.

The application server 3100 may access a memory 3120n or a storage device 3150n included in another application server 3100n through the network 3300 or access memories 3220 to 3220m or storage devices 3250 to 3250m included in the storage servers 3200 to 3200m through the network 3300. By doing this, the application server 3100 may perform various operations on data stored in the application servers 3100 to 3100n and/or the storage servers 3200 to 3200m. For example, the application server 3100 may execute an instruction for moving or copying data among the application servers 3100 to 3100n and/or the storage servers 3200 to 3200m. In accordance with at least some example embodiments of the inventive concepts, data may be moved from the storage devices 3250 to 3250m in the storage servers 3200 to 3200m to memories 3120 to 3120n in the application servers 3100 to 3100n directly or through the memories 3220 to 3220m in the storage servers 3200 to 3200m. Data moved through the network 3300 may be encrypted for security or privacy.

When describing the storage server 3200 as an example, an interface 3254 may provide a physical connection between the processor 3210 and a controller 3251 and a physical connection between a network interface controller (NIC) 3240 and the controller 3251. For example, the interface 3254 may be implemented by a direct attached storage (DAS) scheme of directly accessing the storage device 3250 by using an exclusive cable. In addition, for example, the interface 3254 may be implemented by various interface schemes such as an advanced technology attachment (ATA) interface, a serial ATA (SATA) interface, an external SATA (e-SATA) interface, a SCSI, a serial attached SCSI (SAS), a peripheral component interconnection (PCI) interface, a PCIe interface, an NVM express (NVMe) interface, an Institute of Electrical and Electronics Engineers (IEEE) 1394 interface, a universal serial bus (USB) interface, a secure digital (SD) card interface, a multi-media card (MMC) interface, an embedded multi-media card (eMMC) interface, a UFS interface, an embedded universal flash storage (eUFS), or a compact flash (CF) interface.

The storage server 3200 may further include a switch 3230 and the NIC 3240. The switch 3230 may selectively connect the processor 3210 or the NIC 3240 to the storage device 3250 under control of the processor 3210.

In an embodiment, the NIC 3240 may include a network interface card, a network adapter, or the like. The NIC 3240 may be connected to the network 3300 by a wired interface, a wireless interface, a Bluetooth interface, an optical interface, or the like. The NIC 3240 may include an internal memory, a digital signal processor (DSP), a host bus interface, and the like and may be connected to the processor 3210, the switch 3230, and/or the like through a host bus interface. The host bus interface may be implemented by one of the examples of the interface 3254 described above. In an embodiment, the NIC 3240 may be integrated with at least one of the processor 3210, the switch 3230, and the storage device 3250.

Processors 3110 to 3110n or 3210 to 3210m in the storage servers 3200 to 3200m or the application servers 3100 to 3100n may program or read data by transmitting a command to storage devices 3150 to 3150n or 3250 to 3250m or the memories 3120 to 3120n or 3220 to 3220m. In accordance with at least some example embodiments of the inventive concepts, the data may be error-corrected through an ECC engine. The data is data bus inversion (DBI)- or data masking (DM)-processed data and may include cyclic redundancy code (CRC) information. The data may be encrypted for security or privacy.

The storage devices 3150 to 3150n or 3250 to 3250m may transmit a control signal and a command/address signal to NAND flash memory devices 3252 to 3252m in response to a command received from the processors 3110 to 3110n or 3210 to 3210m. Accordingly, when data is read from the NAND flash memory devices 3252 to 3252m, a read enable (RE) signal may be input as a data output control signal to output the data through a digital output (DQ) bus. A data strobe (DQS) may be generated by using the RE signal. The command/address signal may be latched to a page buffer at a leading edge or a trailing edge of a write enable (WE) signal.

The controller 3251 may control a general operation of the storage device 3250. In an embodiment, the controller 3251 may include SRAM. The controller 3251 may write data in the NAND flash memory device 3252 in response to a write command or read data from the NAND flash memory device 3252 in response to a read command. For example, the write command and/or the read command may be provided from the processor 3210 in the storage server 3200, the processor 3210m in another storage server 3200m, or the processor 3110 or 3110n in the application server 3100 or 3100n. DRAM 3253 may temporarily store (buffer) data to be written on the NAND flash memory device 3252 or data read from the NAND flash memory device 3252. In addition, the DRAM 3253 may store metadata. Herein, the metadata is data generated by the controller 3251 to manage user data or the NAND flash memory device 3252. The storage device 3250 may include a secure element (SE) for security or privacy.

Example embodiments of the inventive concepts having thus been described, it will be obvious that the same may be varied in many ways. Such variations are not to be regarded as a departure from the intended spirit and scope of example embodiments of the inventive concepts, and all such modifications as would be obvious to one skilled in the art are intended to be included within the scope of the following claims.

What is claimed is:

1. A storage device comprising:
a buffer memory configured to temporarily store data;
a plurality of nonvolatile memory devices;
a storage controller circuit configured to
generate buffer memory status information by monitoring a status of the buffer memory,
operate in a congestion control mode by setting a buffer memory data transmission authority of a nonvolatile memory device based on the generated buffer memory status information, generate data tokens based on a utilization rate of the buffer memory,
allocate the data tokens to the plurality of nonvolatile memory devices based on a priority table, the priority table indicating data transmission priorities of the plurality of nonvolatile memory devices, and
control data transmission of the plurality of nonvolatile memory devices according to the allocated data tokens; and
a first interface circuit configured to communicate with the storage controller circuit and the plurality of nonvolatile memory devices,
wherein the first interface circuit is connected to a network based on an Ethernet interface.

2. The storage device of claim 1, wherein the plurality of nonvolatile memory devices are configured to perform data transmission rate control based on information including the buffer memory data transmission authority, which is received from the storage controller circuit.

3. The storage device of claim 1,
wherein the storage controller circuit is configured to control data transmission of the plurality of nonvolatile memory devices based on the priority table.

4. The storage device of claim 3, wherein the priority table further includes a weight for each nonvolatile memory device, which is set based on a data request order and a requested data amount.

5. The storage device of claim 1, wherein the storage controller circuit is configured to control the data transmission of the plurality of nonvolatile memory devices according to a preset scheduling scheme based on the priority table and the data tokens.

6. The storage device of claim 1, wherein the storage controller circuit is configured such that the storage controller circuit has
a first stage of operating in a congestion control mode when a utilization rate of the buffer memory is greater than a first limit value, and
a second stage of temporarily suspending data transmission when the utilization rate of the buffer memory is greater than a second limit value.

7. The storage device of claim 1, wherein the storage controller circuit is configured to control at least one a bandwidth, a data transmission rate, or a power consumption amount of the first interface circuit based on the utilization rate of the buffer memory.

8. The storage device of claim 1, further comprising:
a second interface circuit configured to control a data transmission amount of the plurality of nonvolatile memory devices through the storage controller circuit.

9. The storage device of claim 1, wherein the storage controller circuit is configured to,
estimate utilization rate of the buffer memory by monitoring input and output data and a data transmission rate of the buffer memory, and
operate in congestion control mode based on the estimated utilization rate of the buffer memory.

10. A method of operating a storage device, the method comprising:
generating buffer memory status information by monitoring a status of a buffer memory;
setting a data transmission mode of a plurality of nonvolatile memory devices based on the generated buffer memory status information;
controlling the plurality of nonvolatile memory devices based on the set data transmission mode;
generating data tokens based on a utilization rate of the buffer memory;
allocating the data tokens to the plurality of nonvolatile memory devices based on a priority table, the priority table indicating data transmission priorities of the plurality of nonvolatile memory devices; and
controlling data transmission of the plurality of nonvolatile memory devices according to the allocated data tokens,
wherein the data transmission mode includes a congestion control mode including setting a data transmission authority of a nonvolatile memory device in response to the utilization rate of the buffer memory being greater than a preset reference value.

11. The method of claim 10,
wherein the controlling includes controlling data transmission of the plurality of nonvolatile memory devices based on the priority table.

12. The method of claim 11, wherein the priority table includes a weight for each nonvolatile memory device, which is set based on a data request order and a requested data amount.

13. The method of claim 12, wherein the controlling further comprises:
controlling the data transmission of the plurality of nonvolatile memory devices according to a preset scheduling scheme based on the priority table and the data tokens.

14. The method of claim 10, further comprising:
communicating with a storage controller circuit and the plurality of nonvolatile memory devices by using a first interface circuit, wherein the first interface circuit is connected to a network based on an Ethernet interface.

15. The method of claim 10, wherein the controlling comprises:
controlling a bandwidth, a data transmission rate, or a power consumption amount of a first interface circuit based on the utilization rate of the buffer memory.

16. The method of claim 10, further comprising:
controlling a data transmission amount of the plurality of nonvolatile memory devices through a second interface circuit.

17. The method of claim 10, wherein the controlling comprises:
estimating the utilization rate of the buffer memory by monitoring input and output data and a data transmission rate of the buffer memory; and
operating in the congestion control mode based on the estimated utilization rate of the buffer memory.

18. A non-transitory computer-readable recording medium having recorded thereon computer-readable instructions that, when executed by one or more processors, cause the one or more processors to perform operations including: generating buffer memory status information by monitoring a status of a buffer memory; setting a data transmission mode of a plurality of nonvolatile memory devices based on the generated buffer memory status information;
controlling the plurality of nonvolatile memory devices based on the set data transmission mode;
generating data tokens based on a utilization rate of the buffer memory; allocating the data tokens to the plurality of nonvolatile memory devices based on a priority table, the priority table indicating data transmission priorities of the plurality of nonvolatile memory devices; and
controlling data transmission of the plurality of nonvolatile memory devices according to the allocated data tokens, wherein the data transmission mode includes a congestion control mode including setting a data transmission authority of a nonvolatile memory device in response to the utilization rate of the buffer memory being greater than a preset reference value.

* * * * *